(12) United States Patent
Millar

(10) Patent No.: US 9,888,694 B2
(45) Date of Patent: Feb. 13, 2018

(54) SLOW COMPRESSION STRETCH PACKAGING

(71) Applicant: Empire Technology Development LLC, Wilmington, DE (US)

(72) Inventor: Benjamin William Millar, Redfern (AU)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 163 days.

(21) Appl. No.: 15/064,361

(22) Filed: Mar. 8, 2016

(65) Prior Publication Data

US 2017/0258099 A1   Sep. 14, 2017

(51) Int. Cl.

| | |
|---|---|
| *A22C 7/00* | (2006.01) |
| *A22C 9/00* | (2006.01) |
| *A23L 13/70* | (2016.01) |
| *A22B 7/00* | (2006.01) |
| *A23L 3/36* | (2006.01) |
| *A22C 17/00* | (2006.01) |
| *A23B 4/06* | (2006.01) |
| *A22B 5/00* | (2006.01) |
| *A23P 30/00* | (2016.01) |

(52) U.S. Cl.
CPC .......... *A22C 7/0023* (2013.01); *A22B 5/0076* (2013.01); *A22B 7/003* (2013.01); *A22C 9/00* (2013.01); *A22C 17/0093* (2013.01); *A23B 4/06* (2013.01); *A23L 3/36* (2013.01); *A23L 13/70* (2016.08); *A23P 30/00* (2016.08)

(58) Field of Classification Search
CPC ......... A22B 5/00; A22B 5/0076; A22B 7/003; A22C 7/00; A22C 7/0023; A22C 9/00; A22C 17/0006; A22C 17/0093; A22C 17/02; A23B 4/06; A23L 3/36; A23L 13/70; A23P 10/10; A23P 30/00
See application file for complete search history.

(56) References Cited

U.S. PATENT DOCUMENTS

| | | | | |
|---|---|---|---|---|
| 2,146,815 | A | * | 2/1939 | Geffner .................... A22B 5/00 27/21.1 |
| 2,214,153 | A | * | 9/1940 | Williams ................. A22B 5/00 426/393 |
| 2,371,967 | A | * | 3/1945 | Lohner ................. B65B 25/067 426/393 |

(Continued)

*Primary Examiner* — Drew E Becker
(74) *Attorney, Agent, or Firm* — The Juhasz Law Firm, P.C.

(57) ABSTRACT

A process and an apparatus for controlling temperature loss and shrinkage of meat after an animal is slaughtered for food. Shrinkage is controlled by compressing the meat during cooling, the compression offsetting a natural tendency of the meat to contract and providing a measure of control over the shaping of the meat. Apparatus for the process includes one or more rigid rings for placement around the meat. Each ring is wrapped with a thread secured rigidly to one side of the ring and secured movably to the other side such as to allow the length of thread on the second side of the rigid ring to form at least one winding around the meat. As the meat cools, the thread shrinks, applying the thermal contraction of the thread along the ring to constrict the winding around and thus longitudinally elongate the meat.

22 Claims, 4 Drawing Sheets

(56) References Cited

U.S. PATENT DOCUMENTS

| | | | | |
|---|---|---|---|---|
| 2,682,097 | A * | 6/1954 | Worth | A23C 19/166 |
| | | | | 139/383 R |
| 3,019,722 | A * | 2/1962 | Gum | A22C 7/0046 |
| | | | | 100/1 |
| 3,155,123 | A * | 11/1964 | Williams | B65B 25/067 |
| | | | | 139/426 R |
| 3,955,002 | A * | 5/1976 | Maxon | A22C 21/0038 |
| | | | | 426/132 |
| 4,929,460 | A * | 5/1990 | Lagarde | C08L 83/04 |
| | | | | 426/113 |
| 5,112,274 | A * | 5/1992 | Volk | A22C 21/0038 |
| | | | | 452/174 |
| 6,308,617 | B1 * | 10/2001 | Mignone | A22C 11/005 |
| | | | | 100/14 |
| 2002/0054940 | A1 * | 5/2002 | Grose | A22B 7/007 |
| | | | | 426/231 |
| 2006/0045949 | A1 * | 3/2006 | McLaughlin | A22C 7/00 |
| | | | | 426/420 |

* cited by examiner

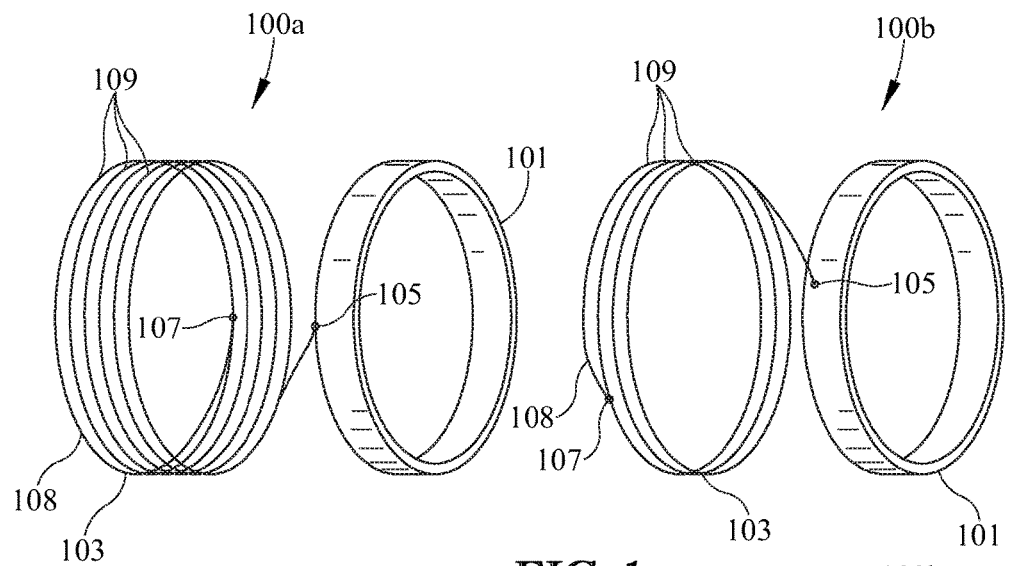
FIG. 1
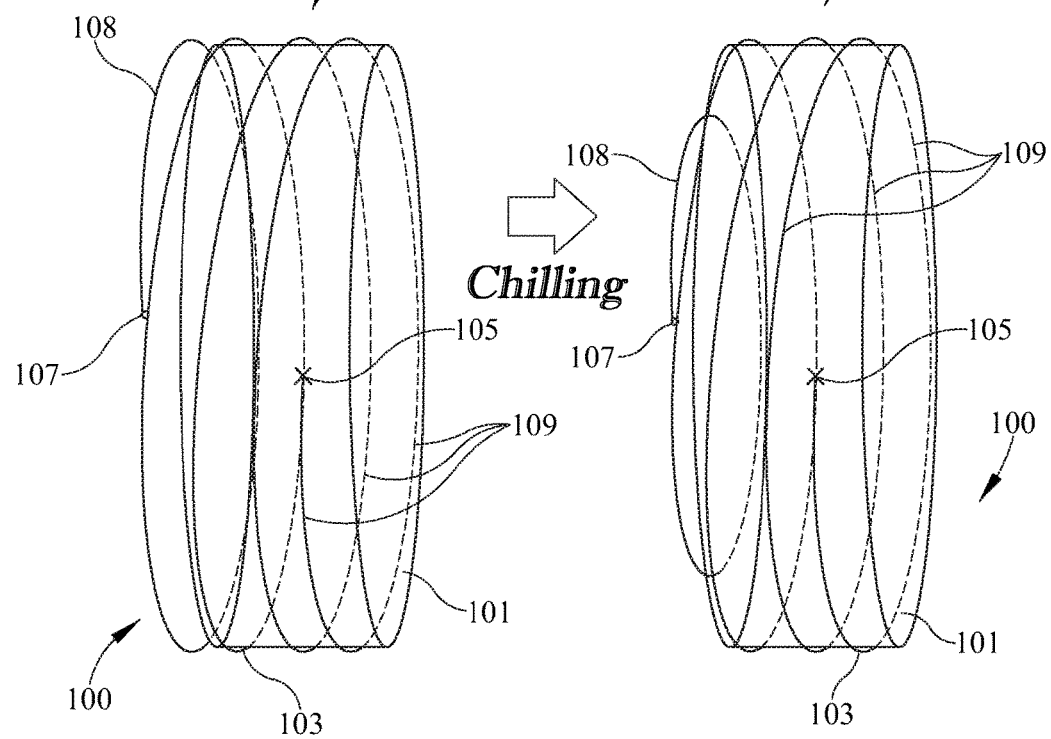
FIG. 2A  FIG. 2B

SLOW COMPRESSION STRETCH PACKAGING

TECHNICAL FIELD

The technical field of the disclosure relates to food processing and packaging and in particular to processing of freshly-slaughtered animals in order to increase the tenderness of the food product.

BACKGROUND

When an animal is slaughtered to be used for food, the meat is likely at the highest temperature it will achieve until it is cooked as part of a food preparation process. Processing of the animal immediately after slaughter is termed hot-bone processing and the meat is known generally as hot-boned meat. As the meat cools, two relatively uncontrolled processes occur as a result of the contraction, that is to say, shortening of muscle fiber during cooling. The first process involves the toughening of the meat that comes with the shortening of the fibers. The second process involves the irregular shaping that may result from such shortening of fibers. If there is no restraint on the shape the meat can take during cooling, the contraction may result in irregular and unfamiliar shapes of the meat and therefore of the cuts that result when the meat is subsequently packaged for selling or serving.

The contraction of muscle fibers and the meat proceed as the temperature of the meat decreases. The contraction is in direct proportion to the temperature decrease. The control of the temperature of cooling thus provides one way to control the toughening and the shaping of the meat during cooling. For example, the rate of cooling may be slowed down in order to provide for more uniform shrinkage of the fibers of the meat. This allows some degree of control over contraction and shrinkage of the meat which may lead to cuts of meat that are more tender and regular in shape. However, a greater degree of control over the contraction of muscle fiber during cooling may improve the tenderness and ability to shape the meat during the cooling process.

Unless otherwise indicated herein, the materials described in this section are not prior art to the claims in this application and are not admitted to be prior art by inclusion in this section.

SUMMARY

Technologies are herein described for a process and apparatus for preventing natural shrinkage in freshly-slaughtered meat. Uncontrolled shrinkage leads to toughness and misshapen forms, which lower the value of the meat.

One illustrative embodiment of the disclosure is an apparatus for stretching fibers of meat upon cooling to prevent toughening of the meat. The apparatus includes a rigid ring for placing around the meat and a length of thread for winding around the rigid ring. A first end of the length of thread is secured fixedly on a first side of the rigid ring and a second end of the length of thread is secured movably on a second side of the ring such as to allow the length of thread on the second side of the rigid ring to form at least one winding around the meat. The rigid ring and the thread are adapted for placement around the meat when the meat is at a first temperature, and as the meat cools to a second, lower temperature, the thread contracts in length according to a coefficient of thermal expansion of the thread. A linear contraction along the length of thread along the rigid ring translates to constriction of the at least one winding around the meat to place a radial compressive force on the meat, causing longitudinal stretching, thus minimizing contraction of the meat.

Another embodiment is a method for stretching meat fibers upon cooling to prevent toughening of meat. The method includes providing a rigid ring, the rigid ring comprising a length of thread wound around the rigid ring. A first end of the length of thread is secured fixedly to a first side of the ring and a second end of the length of thread is secured movably to the length of thread such as to allow the length of thread on the second side of the rigid ring to form at least one winding around the meat. The method also includes placing the rigid ring with the length of thread winding around the meat along a length of the meat at a first temperature, placing at least one winding of the length of thread on the second side of the rigid ring around the meat and cooling the rigid ring, the length of thread and the meat from the first temperature to a second, lower temperature, causing thermal contraction of the meat, the rigid ring and the length of thread. A thermal contraction of the length of thread along the rigid ring translates to a constriction of the at least one winding around the meat to place a radial compressive force on the meat, the cooling thus minimizing contraction of the meat.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 1 is an exploded view of two apparatuses of this disclosure useful in controlling shrinkage and shape of meat as it cools.

FIGS. 2A and 2B are perspective views illustrating a change in shape of the two apparatuses of FIG. 1 as cooling occurs;

DETAILED DESCRIPTION

Figure 3A:
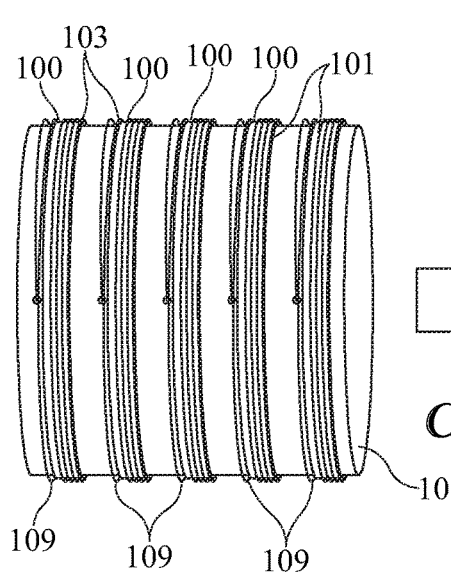
FIGS. 3A-3B are perspective views depicting a change in shape of the two apparatuses of FIG. 1 about a piece of meat and a change in shape of the piece of meat as cooling occurs.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Techniques and technologies are generally described herein for controlling the shrinkage and shape of meat during cooling and before the onset of rigor mortis. Unchecked contraction of muscle fibers during cooling causes shortening of the fibers and toughening of the meat. A lack of restraint on the shape of the meat may result in irregular and unfamiliar forms of meat, and unfamiliar forms of final cuts of the meat in catering service or for retail sales. This disclosure uses standard materials, such as plastics, and leverages and magnifies their thermal properties to retain the desired tenderness and shape characteristics of hot boned meat.

Broadly speaking, this disclosure provides a process and an apparatus for controlling temperature loss and shrinkage of meat after an animal is slaughtered for food. Shrinkage is controlled by radially compressing the meat during cooling, the compression offsetting a natural tendency of the meat to contract by causing longitudinal elongation, and providing a measure of control over the shaping of the meat. An apparatus for the process includes one or more rigid rings for placement around the meat. Each ring is wrapped with a thread secured rigidly to one side of the ring and secured movably to the other side such as to allow the length of thread on the second side of the rigid ring to form at least one winding around the meat. As the meat cools, the thread contracts linearly, applying the thermal contraction of the thread along the ring to a constriction of the winding around and thus a compressive force to the meat.

The technique disclosed herein utilizes the cooling of the meat to accomplish stretching of the meat and to prevent shrinkage and contraction, which causes toughening. One material useful in the present disclosure features both a low cost and a very high coefficient of thermal expansion—and contraction. Linear low density polyethylene (LLDPE) is the most commonly used packaging material for thermal sealing and also provides for easy handling and good barrier properties at a low price. LLDPE also possesses one of the highest linear thermal contraction coefficients of any homogenous solid. This property is magnified in the present disclosure to produce a strong and steady radial compressive force to the meat, thereby preventing contraction of the muscle fibers along a longitudinal axis of the meat. The same force helps to elongate the meat. Other materials may also be used.

During processing, the meat is typically shrink-wrapped in plastic to prevent contamination and to aid in handling and shipping. As the meat cools, the shrink-wrap and fibers wrapped about the meat cool at the same rate. The cooling may be the natural cooling during processing of the meat, and the cooling may be enhanced using mechanical refrigeration. As the meat cools, plastics or other material in contact with the meat or associated with the meat also cool. The threads discussed above also shrink, and materials such as the thread with a high linear thermal contraction coefficient tend to shrink more than other materials, such as the meat. This contraction of the threads about the rigid ring produces a contraction force that is translated to the threads about the meat. More specifically, the contraction of the thread about the rigid ring is translated to the threads about the meat, causing the winding of threads about the meat to shrink in diameter. This shrinkage may be utilized to apply a gradual compression to the meat, applying a compressive force at a slow rate. As the temperature drops, the plastic shrinks at a rate higher than the meat, and thus applies force at a low strain rate to prevent the fibers of the meat which are shrinking at a slower rate than the plastic from shrinking by forcing elongation. This helps to maintain a desired shape of the meat.

Having thus introduced a broad overview of this disclosure, we now turn to features that are provided by this disclosure. Technologies are generally described herein for slow compression stretch packaging of meat in order to constrain the shrinking of the fibers of meat. By minimizing the contraction of meat fibers during cooling according to this disclosure, a meat product results that may be more tender and of a more desirable shape. It is important that in a high volume, cost-conscious application as contemplated herein for food items, that the materials be readily available at low cost. It is also advantageous that the process and techniques used are relatively simple and easily applied by workers in the meat packing industry without complicated training or equipment. The technologies of this disclosure may be readily available at low cost and simple and easily applied by workers in the packing industry without complicated training or equipment; thus making this disclosure an effective technology for controlling the contraction of meat fibers and shaping of meat during cooling. In one illustrative application, the present disclosure finds particular synergy with packaging of hot-boned meat which is typically shrink-wrapped in plastic, such as shrink-wrap polyethylene. The shrink wrap packaging of meat about which the apparatus of the present disclosure may be placed advantageously helps to keep clean the plastic rings and thread of this disclosure that are used to stretch the meat.

In describing this disclosure more fully, we make reference to the accompanying drawings, in which illustrative embodiments of the present disclosure are shown. This disclosure may, however, be embodied in a variety of different forms and should not be construed as so limited by the drawings.

FIG. 1 depicts an exploded view of two apparatuses 100a and 100b useful in the present disclosure. Each of apparatuses 100a and 100b includes a ring 101, which may be made from plastic or other suitably rigid material, to which is secured a length of thread 103. The thread 103 is joined securely to the ring 101 via a joint 105, which may be a plastic spot weld. Alternatively, thread 103 may be joined to ring 101 by any other convenient method. For example, the ring may be provided with a through-orifice through which the thread may be threaded. The thread may be secured to the ring via a knot on the part of the thread that has been threaded through the through-orifice, the knot having a diameter greater than the through-orifice. Alternatively, a side of the ring may be notched, and the thread secured to the ring by tying an end of the thread about the notch. Each of these techniques and other techniques has the advantage that this end of the thread is fixed with respect to the ring.

Joint 105 defines an end of the thread and in particular a fixed position of that end of the thread with respect to the ring.

An opposite end 107 of the thread 103 is not fixed to the ring but is relatively free to move. End 107 may be a loop through which thread 103 is threaded. The loop may be a slip knot, for example, or may be some other loop provided to the end of the thread. For example a small diameter plastic ring may be tied to the end of thread 103 to provide the loop through which thread 103 is threaded.

Thread 103 is seen to form windings 108 and 109. Advantageously, winding 108 is wrapped around a piece of meat whereas windings 109 are wrapped around the ring 101. During processing of the meat, and as the meat cools, the thread contracts according to its linear coefficient of thermal contraction. With end 105 fixed, the thread contracts along its length, and with end 107 free to move, end 107 slips via its slip knot or other loop along thread 103 as contraction takes place. This slipping of end 107 along the thread allows the diameter of winding 108 to become smaller as end 107 slips along the thread while windings 109 at all times are constrained from reducing in diameter by ring 101 which rigidly maintains the shape of windings 108 about the ring throughout the cooling.

It is thus seen that as thread 103 is contracting along its length due to cooling, only winding 108 which is wrapped about the piece of meat is free to be reduced in diameter to cause winding 108 to compress against the meat. Again, this is so since ring 101 which is rigid keeps windings 109 of thread 103 about the ring 101 from reducing in diameter. As a result, each of assembly 101a, 101b serve to translate the increasing contracting force building up along the thread of windings 109 during cooling to increasing the force applied to the thread of winding 108. Since winding 108 is not constrained to maintain its diameter since winding 108 lies against the piece of meat and not against ring 101, the increasing force from windings 109 translated to winding 108 causes winding 108 to be reduced in diameter on account of end 107 slipping along thread 103 in response to the applied force. Hence, as the force on the thread due to cooling continues to contract the thread, the loss of thread length causes winding 108 (but not windings 109) to reduce in diameter, causing winding 108 (but not windings 109) to apply a compressive force to the piece of meat about which it is wrapped.

As depicted in FIG. 1, more than one apparatuses 100a, 100b are shown since a series of apparatuses, spaced apart along the length of the meat may provide more controlled compression of the piece of meat by windings 108 and maintenance of meat fibers in a more elongated positing during the cooling of meat. However, a single apparatus 100a may be used. The number of apparatus 100a and placement about a piece of meat is a matter of design choice.

Referring now to FIGS. 2A-2B, an apparatus 100a of FIG. 1 is depicted as it is placed around a primal cut of meat, such as a side of beef or a loin (not pictured). The primal cut of meat may have been processed to the extent that it is separated from other cuts of meat and has been shrink-wrapped in plastic, and may also have been vacuum processed, e.g., a vacuum placed on the shrink wrap or other cover before it is completely sealed. Ring 101 may be made of a relatively rigid plastic, PVC, the plastic rigid as compared to the warm or room temperature meat about which the plastic ring is placed. In FIG. 2A, ring 101 has been placed around the meat, with most of thread 103 wrapped about the ring itself. This is depicted by windings 109. Thread 103 is secured to the right side of ring 101, in this illustrative example by a plastic weld 105 on a top surface of the ring. In other embodiments, the thread may be welded or otherwise secured in a fixed manner to the ring as previously explained. The remainder of the thread is wrapped about the piece of meat. In FIG. 2A, this is shown by single winding 108 of the thread; although more than a single winding may go about the piece of meat. The number of windings of thread to be placed about the meat and the number of windings of thread to be placed about the ring are a matter of design choice. Note that since the apparatus has just been placed about the piece of meat, a diameter of the final turn 108 is approximately equal to the outer diameter of ring 101 and is also approximately equal to the diameter of the remainder of the turns of windings 109 of thread about the ring.

Significantly, at least the final turn that forms winding 108 in this example is not wrapped about ring 101, but is wrapped about the meat (not shown in FIGS. 2A-2B). The final turn that forms winding 108 is illustratively joined to the ring with a terminal loop or knot, such as a slip knot. Although as previously explained, a ring may be affixed to end 107 or other type of loop may be used that allows thread 101 to slip through the loop according to this disclosure.

As the process starts, the meat, the ring and the thread may be at room temperature, or the meat may even be above room temperature, with the ring and the thread at room temperature. However, the meat and ring and thread may also be below room temperature and the ring and thread may also be above room temperature although these may be less effective as the previous example in the process of this disclosure for the reasons explained in this disclosure. In FIG. 2B, after a period of time and chilling, a temperature of the meat and the apparatus will be lowered in accordance with its environment. For example, a cooler with mechanical refrigeration may be used. The meat will shrink slightly, as may the diameter of the ring. Thread 103, however, due to the several to many loops about ring 101, will experience much greater shrinkage. This is because of the contracting properties of the thread 103. Accordingly, as seen in FIG. 2B, the ring does not shrink noticeably after cooling but the thread does. As thread 103 shrinks, the shrinkage is resisted by the plastic ring and also by turns of thread that are wrapped about ring 101. The shrinkage is also restricted on the right-hand side by plastic weld 105, which cannot move because its location is fixed. The final turn forming winding 108 is not so restrained, however, and is free to move due to the slipping of the thread through the slip knot or loop at end 107 of the thread as the thread contracts. Thus, final turn that forms winding 108 is free to move on account of the slipping of the thread through the slip knot or loop at end 107 of the thread. As a result, the final turn that forms winding 108 contracts in diameter, as shown by the smaller diameter of the final turn.

As final turn forming winding 108 shrinks, there is nothing to oppose that shrinkage to keep the diameter of winding 108 from shrinking unlike the diameter of windings 109 whose diameters are maintained effectively constant and hence the shape of the windings 108 are maintained effectively the same shape throughout the cooling process by the ring of rigid material about which windings 108 are placed.

As a result, the shrinking diameter of winding 108 applies a compressive force to the meat. Because the other end 105 of thread 103 cannot move or contract, and the entire length of thread 103 being subject to thermal contraction, the contraction force on the thread of windings 109 about ring 101 due to cooling are translated to winding 108 about the meat due to the coaction of ring 101 constraining the diameter of windings 109 from shrinking and end 107, through which slip knot or other loop thread 101 is free to move as the thread contracts along its length thereby allowing the diameter of winding 108 to decrease. In effect, the force of contraction along the thread of windings 109 is opposed by the relative rigidity of ring 101 whereas the force of contraction along the thread of winding 108 is not; rather it is illustratively opposed by the meat. Some of the force of contraction will be expended on friction or resistance of the thread against the ring 101, but most of the force is directed toward free end 107 and final loop which makes up winding 108. As a result, the force of contraction generated along the entire length of the thread is translated to a force for compressing winding 108 and hence the meat about which it is wound.

Figure 3B:
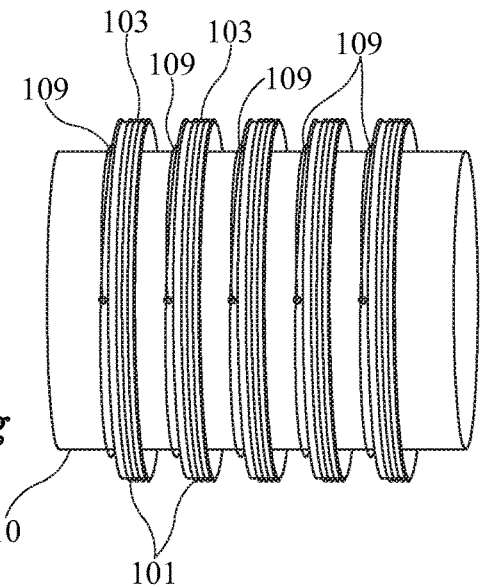

The result of the compressive forces and the compression and cooling processes are depicted in FIGS. 3A-3B. In FIG. 3A, hot-boned meat 120 has been shrink-wrapped and fitted with five apparatuses 100a as discussed above. Each apparatus 100a includes a ring 101 and thread 103, with a final turn that forms winding 108 that is available for wrapping about the shrink-wrap and compressing the meat 10. After chilling, the meat 120 and the apparatuses take the shape depicted in FIG. 3B, which is exaggerated for effect. The rigid rings 101 will not shrink appreciably, but the meat 120, subject to compressive stress from the final turn that makes up each winding 108, will be compressed in a radial direction. Since the meat is relatively solid and is not able to accommodate a great deal of radial strain, the meat will elongate in accordance with Poisson's ratio. Poisson's ratio defines the relationship of unit lateral (sideway) strain to unit longitudinal (axial) strain. One value of Poisson's ratio for soft muscle tissue is about 0.49 (dimensionless). In an example, if lateral strain or compression due to the thread is a radial or diametral reduction of 4.6 cm, then the longitudinal stretching, according to Poisson's ratio, is 2.25 cm.

Figure 4:
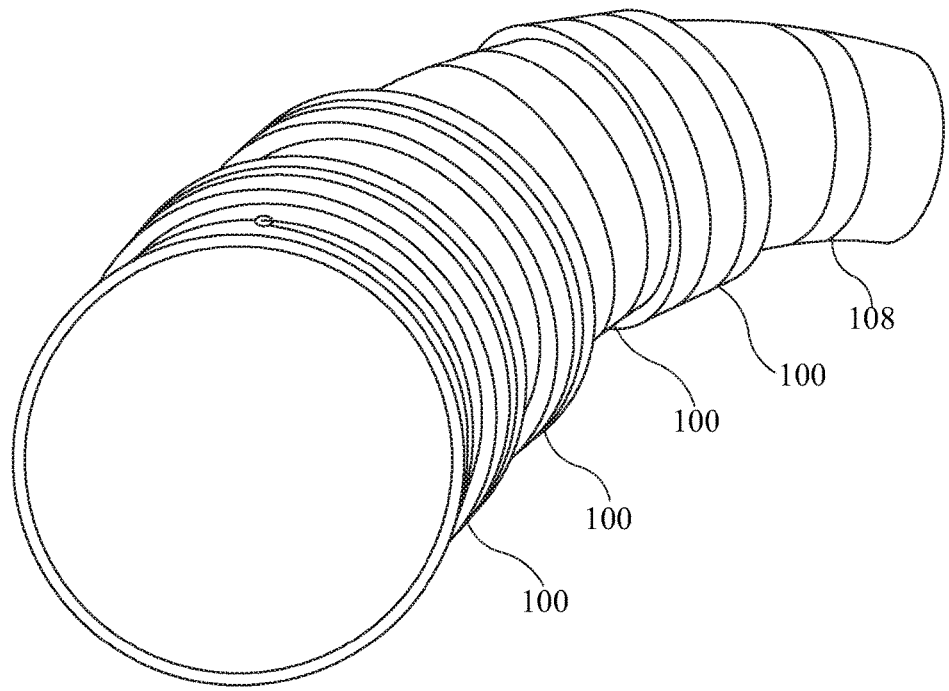
FIG. 4 is an end view depicting a plurality of apparatuses of the present disclosure deployed for use in controlling shrinkage of meat.
Figure 5:
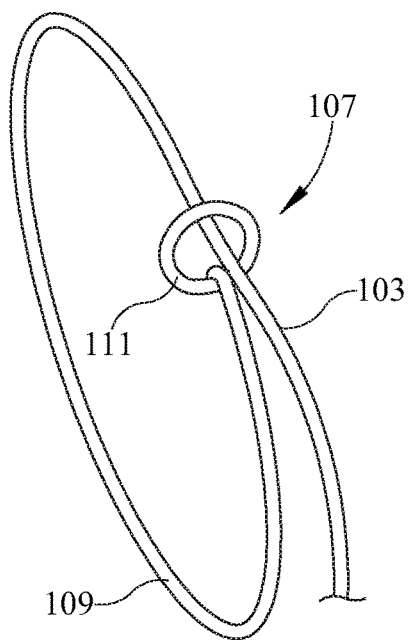
FIGS. 5 and 6 are close-up views depicting a fixed end and a moveable end of a thread with a high coefficient of linear expansion and contraction for use with the apparatus of this disclosure.
Figure 6:
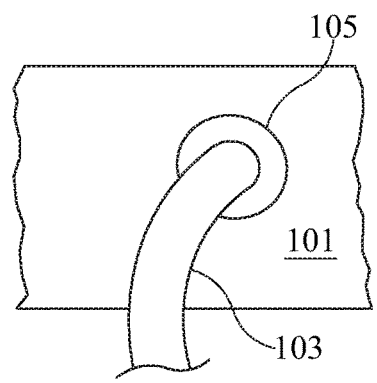

Details of the apparatuses are shown in FIGS. 4, 5 and 6. FIG. 4 depicts a generally end-view of a plurality of apparatuses $100a^1$, $100a^2$, and $100a^3$, used for compressing the meat. In this example each of $100a^1$, $100a^2$, and $100a^3$ are depicted with several windings 108 about meat 120 and indeed apparatus $100a^3$ is depicted with several windings 108 on either end of ring 101. More specifically, apparatus $100a^3$ show windings 108a on one side and windings 108b on the other side of ring 101. In this example, two threads may be used, each having a first end affixed to ring 101 by joint 105 as previously described. A first thread may then wind around ring 101 in one direction and terminate with windings 108a about meat 120 and a second thread may wind around ring 101 in the other direction and terminate with windings 108b around meat 120.

FIG. 5 depicts end turn 108 of thread 103. In this embodiment, end turn of winding 108 is movably secured to meat (not shown) via loop 111. With end turn of winding 108 free to contract, a diameter of the winding 108 only will shrink. The winding about the ring of apparatus 100a does not shrink because of the opposing force of ring 101. End turn of winding 108 is free to contract as loop 111 allows end turn of winding 108 to slide through the loop, decreasing the diameter of winding 108 and applying a compressive stress to the meat. As discussed, and depicted in FIG. 6, the opposite end of thread 103 is secured to ring 101 via a plastic spot weld 104 or other technique as previously explained to form spot weld 105.

Figure 7A:
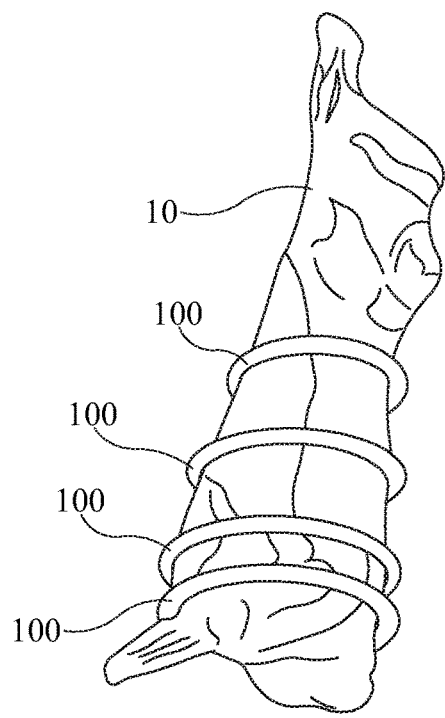
FIGS. 7A and 7B are side views of a plurality of apparatuses of this disclosure in use and the change in shape that occurs upon cooling using the apparatuses and the present disclosure.
Figure 7B:
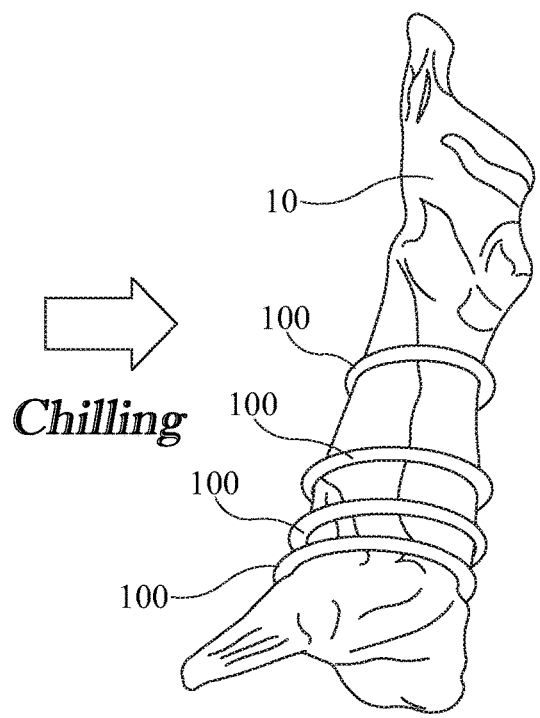

FIGS. 7A-7B depict the apparatus in use in illustrative embodiments. In FIG. 7A, a side of beef 10 is fitted with four apparatuses 100a along the length of the side of beef. Chilling is applied, as by moving the meat and the apparatuses into a cooler. As shown in FIG. 7B, which is exaggerated for effect, the process of chilling the meat results in a radial contraction and an axial elongation of the meat. This process thus counteracts the natural tendency of the meat to contract and toughen. Further details of the investigation and several illustrative examples are also shown.

EXAMPLE 1

In a first example, a large hot-boned primal cut of beef is compression stretched to preserve tenderness. In this example, a polyethylene shrink wrapped, hot-boned beef round (part of a hind-quarter) is approximately 20 cm average diameter and 50 cm in length. The round is fitted with 5 compression rings of approximately 20 cm interior diameter, distributed equally along its length. The rings are made of relatively rigid PVC, each ring approximately 8 cm wide, with a wall thickness of 3 mm The contracting thread is composed of a Huntsman Advanced Materials Rexell® Series LLDPE with a coefficient of thermal expansion of 200 µm/m-K, and an elastic modulus of 800 MPa. The thread has an elliptical cross-section with an average diameter of 5 mm The thread is 13.2 m in length, with 12.6 m of this length disposed around the rigid ring in 20 winds, and one 0.6 m wind adjacent to the wrapped meat surface. Thus, about 4.5% of the length of the thread is able to apply a compressive force to the meat.

The rings are heated to 60° C. before placement around the beef cut. The cut and encompassing rings are then cooled to 5° C. over a period of several hours. The thread contracts 14.5 cm linearly over this range, resulting in a 4.6 cm (23%) radial contraction in the winding adjacent to the meat surface, with an effective pressure of 8.8 MPa. The Poisson ratio for soft muscle tissue is generally assumed to be approximately 0.49, therefore the longitudinal stretching of the round cut is 2.25 cm. Once cooling is completed and the meat has undergone rigor mortis, the rings are removed and steam sterilized for reuse. The shrink wrap minimizes contact of the apparatus of this disclosure with the meat. The elliptical shape of the thread and the shrink wrap also minimize any tendency of the thread to cut into the meat and thus dissipate the compressive force.

Without being limited to this embodiment, it is believed that about a 20% radial contraction is useful in achieving elongation in a desired degree to prevent contraction of the meat and the resulting toughening of the meat. Elongation may also be encouraged by lengthwise hanging of cuts of meat, the elongation assisted by the pull of gravity as well as the lengthening due to radial contraction via Poisson's ratio.

EXAMPLE 2

In a second example, compression stretching is used to preserve tenderness on an expensive cut of meat. An unwrapped hot-boned beef sirloin of approximately 16 cm average diameter and 40 cm in length is fitted with eight compression rings of approximately 16 cm interior diameter, distributed equally along its length. The rigid PVC portion of each ring is approximately four cm wide, with a wall thickness of 3 mm The contracting thread used is composed of a Huntsman Advanced Materials Rexell® Series LLDPE with a coefficient of thermal expansion of 200 µm/m-K and an elastic modulus of 1000 MPa. The thread has a circular cross-section with an average diameter of five mm The thread is 5.53 m in length, with 5.03 m of this length disposed around the rigid ring in 10 winds, and one 0.5 m wind adjacent to the meat surface. In this example only about five percent of the length of the thread is used to apply the compressive force of contraction.

The beef sirloin and encompassing rings are cooled from 35° C. to 5° C. The thread contracts 3.3 cm linearly over this range, resulting in a 1.1 cm radial contraction in the wind adjacent to the meat surface, with an effective pressure of 6 MPa. Thus, even though only five percent of the thread is in contact with the meat, about one-third of the linear shrinkage is applied by that five percent of the thread, the final 0.5 m wind. The Poisson ratio for soft muscle tissue is generally assumed to be about 0.49, therefore the longitudinal stretching of the sirloin cut is 0.53 cm. Again, once cooling is completed and the meat has undergone rigor mortis, the rings are removed and steam sterilized for reuse.

EXAMPLE 3

In a third example, a larger cut is compression stretched during chilling and rigor mortis to preserve tenderness. In this example, a side of beef is hung lengthwise. The side of beef is approximately sixty cm average diameter near the forequarters (chuck portion), 40 cm diameter near the hindquarters, and 1.4 m in length. The side of beef is fitted with 6 compression rings. Two rings are approximately 60 cm interior diameter, two are approximately 50 cm diameter and two are approximately 40 cm in diameter. The rings are distributed about equally along the length of the cut at appropriate diameters. The rigid PVC portion of each ring is approximately 16 cm wide, with a wall thickness of 8 mm The contracting thread is composed of a polypropylene stiffened LLDPE with a coefficient of thermal expansion of 200 μm/m-K and an elastic modulus of 700 MPa. The thread has an elliptical cross-section with an average diameter of 8 mm The thread is 39.6 m in length, with 37.7 m of this length disposed around the rigid ring in 20 winds, and one 1.9 m wind adjacent to the ribcage surface in the forequarters. Thus, about five percent of the length of the thread is able to apply compressive force to the meat.

In this example, the beef carcass and encompassing rings are cooled from 35° C. to 2° C. during a period of several hours. The thread contracts 26.1cm linearly over this range, resulting in an 8.8 cm radial contraction in the wind adjacent to the carcass surface, with an effective pressure of 4.6 MPa. Once cooling is completed and the carcass has undergone rigor, the rings are removed and disinfected with ethanol for reuse.

The above examples are illustrative of only a few ways to use the present disclosure. For example, only the final turn of the thread that forms the winding about the meat was used to apply the force. This has the effect of causing the final turn that forms the winding to experience more than its share of linear contraction because the remaining turns, coiled about the rigid rings, are not able to apply the stress. In other embodiments, more than one turn may be used to form a winding off the ring to apply the force, e.g., two or more turns. In another embodiment, the string may be secured at the center of the top portion of the ring and a final turn to form a winding about the piece of meat on each side of the ring may be used to apply a compressive force.

Figure 8:
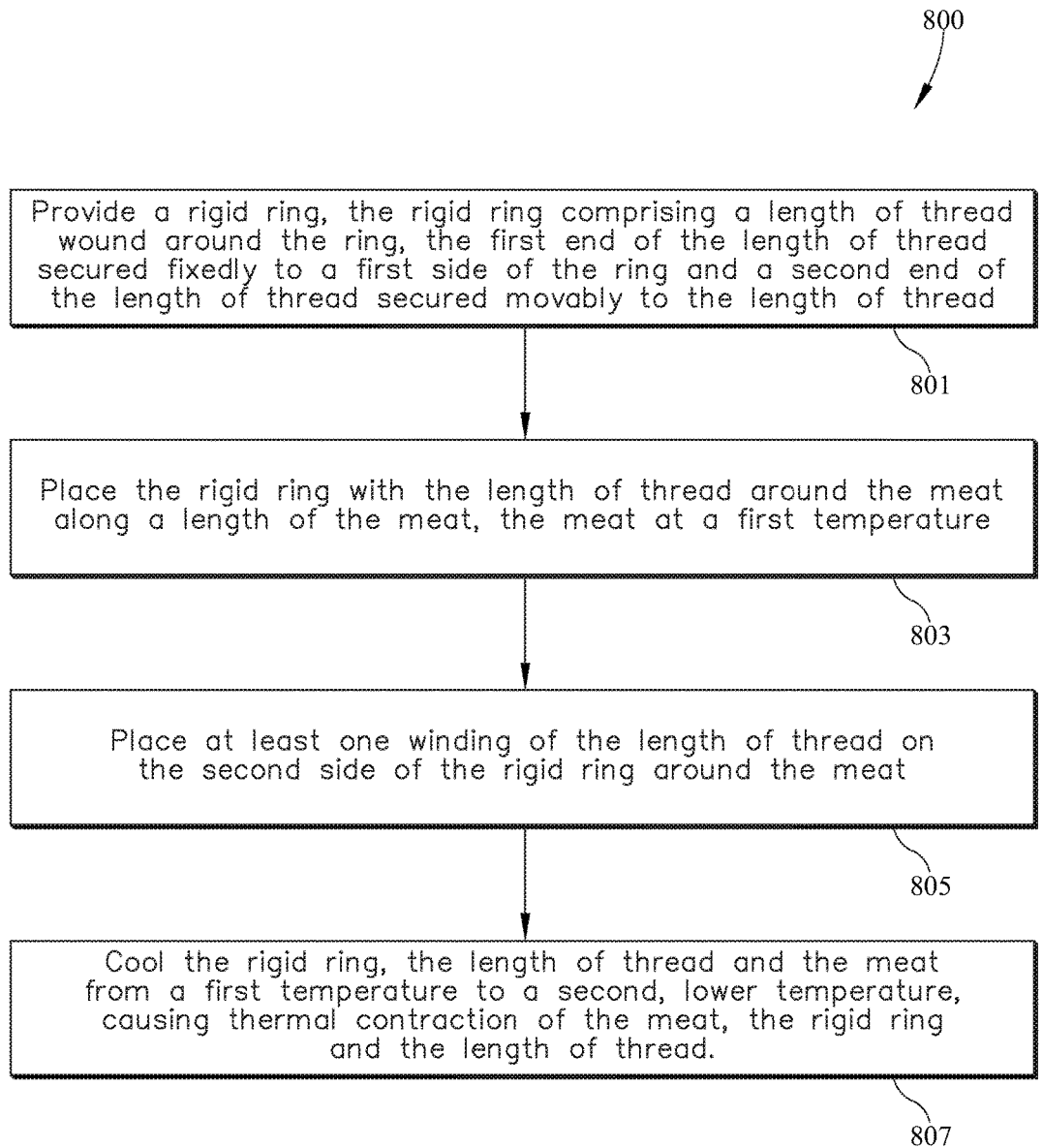
FIG. 8 is flow chart for an illustrative method of using the apparatus of the present disclosure; all of the figures arranged according to at least some embodiments presented herein.

One illustrative example of a method for stretching meat fibers upon cooling is depicted in FIG. 8. In this method, a first step is to provide 801 a rigid ring, the rigid ring comprising a length of thread wound around the rigid ring, a first end of the length of thread secured fixedly to a first side of the ring and a second end of the length of thread secured movably to the length of thread. The rigid ring with the length of thread is then placed 803 around the meat, along a length of the meat, the meat at a first temperature. At least one winding of the length of thread on the second side of the rigid ring is than placed 805 around the meat. The rigid ring, the length of thread and the meat are then cooled 807 from the first temperature to a second, lower temperature. The cooling causes thermal contraction of the meat, the rigid ring and the length of thread, a thermal contraction of the length of thread along the rigid ring translating to a compressive force on the at least one winding around the meat to place a compressive force or constriction on the meat, the cooling thus compressing the meat and lengthening the meat.

The process is described above primarily for cuts of beef, which comprise a high volume in both a physical sense and in their value in commerce. Other meats may also be processed using the techniques discussed above, such as lamb, goat meat, and the like.

Elliptical threads are advantageous in that they are less likely to cut through the meat, or to cut through shrink-wrap or other wrap and the meat. Wider threads are also desirable, in that a width of several millimeters is less likely to cut through the wrap and the meat. As noted in Example 2 above, however, round thread may be used, especially threads with a larger diameter that are less likely to cut through. Of course a 5 mm diameter "thread" is very thick, 5 mm being a little under ¼ inch in diameter, and unlikely to cut through shrink-wrap or a vacuum bag wrap, and the meat. With thread widths of 5 mm and 8 mm in the above examples, the thread may almost be thought of as a strap, rather than a mere "thread."

The "thread" used in the above examples has a very high linear rate of thermal expansion and contraction. Other threads with lesser degrees of thermal expansion/contraction may also be used, but they may be able to apply only lesser amounts of force. The force applied also depends on the elastic modulus (stiffness) of the thread, with a thread having a higher elastic modulus able to apply more force as its length decreases with a temperature change. Thus, many threads with a variety of thicknesses, coefficient of thermal expansion or contraction and elastic modulus, may be used. The apparatus used for particular cuts of meat will vary, as will the dimensions of the meat. As noted in the examples above, the rings may also vary in their inner and outer diameters, width and thickness. The best results will be obtained by using apparatuses with the dimensions to fit the particular meat to be processed.

Threads with high coefficients of thermal expansion are useful in embodiments of the present disclosure, as are threads having a high elastic modulus. Other examples form the series mentioned above may have elastic moduli varying from 700 MPa to 1.57 GPa. These examples and a thread with another suitable elastic modulus may be used. Some of the examples also had very high coefficients of thermal expansion, such as of 200 μm/m-K. Threads with lower coefficients may also be used, such as a thread with a coefficient of 100 μm/m-K. The compressive force applied will be less, in accordance with the actual thermal contraction and the force-multiplying power of the stiffness or modulus of the thread.

There are many embodiments of the present disclosure. It is clear from the above that linear contraction of the thread provides the force that drives the compression and elongation of the meat. It is possible to use other, similar techniques to achieve compression. For example, rather than using rigid rings, such as PVC rings, thick elastomeric bands may be used, the bands containing impermeable pockets of a gas. The gas may be, for example, air or nitrogen, or other gas. The bands maintain their volume and diameter at room temperature or at an elevated temperature. As the meat and the bands cool, the gas within the pockets loses volume in accordance with the gas law. The bands then shrink, causing compression of the meat which is confined by the bands. In another embodiment, the bands may be permeable, or have an impermeable outer layer. The impermeable layer may be removed when the cooling process is begun. The gas escapes by permeating the band. As the gas escapes, a volume of the bands decreases and contraction around the meat occurs. Other techniques may also be used.

In view of this disclosure, it will be seen that technologies are generally described for slow compression stretch packaging. As noted, the technique is advantageously used on cuts of meat that have been shrink-wrapped. These cuts may include sides of an animal, such as a side of beef or a side of lamb, as well as smaller cuts, such as a round or a sirloin. In researching the techniques, it was discovered that stretching was beneficial to many types of cuts, and most beneficial to high quality beef from young cattle and produced higher and more consistent improvements in the tenderness of lamb. One aspect of the technology is that the techniques described above for slow compression may be fit into existing vacuum packaging machinery used in packing houses.

In many situations, meat packers have production lines for producing and packaging meat using shrink wrap machines. Accordingly, slow-compression apparatuses and methods, as described above, may be simply added to the end of an existing production line without interference to the upstream processes. These upstream processes typically include a shrink-wrap step near the end for shrink-wrapping and preserving the cuts of meat. Shrink-wrapping may be used in conjunction with vacuum packaging, that is, the shrink-wrap acts to preserve a vacuum around the product, adding longer life and better appearance to the product.

As mentioned above, polyethylene shrink wrap may advantageously be used. Other plastic shrink wrap materials that are commercially available include single-layer polypropylene, soft PVC, polyester, polyamide, polyvinylidenechloride (PVDC) and ethylenevinyl alcohol (EVOH). Multilayer films may also be used, typically to enhance the oxygen-barrier and the water-vapor barrier properties of the wrap. Machines that are used, and are compatible with the slow compression disclosure herein, include single chamber vacuum machinery, double chamber and automatic belt machinery. Since existing vacuum and packaging techniques are used, the products are suitable for marketing and distribution to the domestic market for the meat packer, as well as export markets. The existing package, or enhanced packaging using these materials, may be used for wholesale or retail distribution. This may allow for distribution in additional channels. In addition to shrink wrapping, it is also possible to use actual vacuum bags on the product. Typically, however, shrink wrapping is performed automatically with rolls of polymer or plastic film, and the process may be faster and more efficient than using discrete vacuum bags.

There are many advantages to the disclosed apparatuses and methods, including lower energy requirements by removing a need to pre-chill the meat and increased yield through increased moisture content. The cooling rate of individual cuts of meat can be carefully controlled after wrapping by using immersion cooling. Immersion cooling includes immersion in cold water or cold water spray. This results in cuts with increased tenderness. No change is required in the packaging used, and thus the same existing packaging may be used for the present multiple distribution channels. The consumer benefits from meat that is more tender and more attractive due to its retained shape.

One embodiment of the disclosure is an apparatus for stretching fibers of meat upon cooling to prevent toughening of the meat. The apparatus includes a rigid ring for placing around the meat and a length of thread for winding around the rigid ring, a first end of the length of thread secured fixedly on a first side of the rigid ring and a second end of the length of thread secured movably on a second side of the ring such as to allow the length of thread on the second side of the rigid ring to form at least one winding around the meat. The rigid ring and the thread are adapted for placement around the meat when the meat is at a first temperature, and as the meat cools to a second, lower temperature, the thread contracts in length according to a coefficient of thermal expansion of the thread, a linear contraction along the length of thread along the rigid ring translating to a compressive force on the at least one winding around the meat to place a constriction on the meat, thus lengthening the meat or preventing contraction of the meat.

Another embodiment may include a plurality of apparatuses as described above, each rigid ring of the plurality of rigid rings spaced apart from other rigid rings of the plurality of rings. In another embodiment, the rigid ring is made from PVC or is a PVC composite. In some embodiments, the thread includes linear low density polyethylene (LLDPE). In some embodiment, the thread is a thermoplastic material having a thermal expansion/contraction of at least 200 micrometers/meter-K. In some embodiments, the thread has a coefficient of thermal expansion and contraction greater than a coefficient of thermal expansion and contraction of plastic used for the plurality of plastic rings. In embodiments, each of the lengths of thread is sufficiently long for a plurality windings of the thread around one of the plurality of plastic rings and a single winding of the thread around the meat. In some embodiments, the second end of thread that is wound around the meat is from 5% to 10% of the length of the thread. The remainder of the thread remains wound around the rigid ring. In some embodiments, as the meat cools to a lower temperature, the rigid ring restricts contraction of the winding of the thread about the rigid ring so that a contraction of the winding of the thread in the second end about the meat is disproportionately greater than the contraction of the winding of the thread around the rigid ring. In some embodiments, the thread has an elliptical cross section with an average of 5 mm of a major diameter and a minor diameter of the thread. In some embodiments, the rigid ring is from about 3 cm to 8 cm wide with about 2 mm to 8 mm wall thickness.

Another embodiment is a method for stretching meat fibers upon cooling to prevent to prevent toughening of meat. The method includes providing a rigid ring, the rigid ring comprising a length of thread wound around the rigid ring, a first end of the length of thread secured fixedly to a first side of the ring and a second end of the length of thread secured movably to the length of thread such as to allow the length of thread on the second side of the rigid ring to form at least one winding around the meat. The method also includes placing the rigid ring with the length of thread winding around the meat along a length of the meat at a first temperature, placing at least one winding of the length of thread on the second side of the rigid ring around the meat and cooling the rigid ring, the length of thread and the meat from the first temperature to a second, lower temperature, causing thermal contraction of the meat, the rigid ring and the length of thread, wherein a thermal contraction of the length of thread along the rigid ring translating to a compressive force on the at least one winding around the meat to place a constriction on the meat, the cooling thus compressing the meat radially and lengthening the meat longitudinally.

Another embodiment is a method for stretching meat fibers upon cooling to prevent toughening of meat. The method includes steps of providing a rigid ring, the rigid ring comprising a length of thread wound around the rigid ring, a first end of the length of thread secured fixedly to a first side of the ring and a second end of the length of thread secured movably to the length of thread such as to allow the length of thread on the second side of the rigid ring to form at least one winding around the meat. The method then requires placing the rigid ring with the length of thread around the meat along a length of the meat, the meat at a first temperature, placing at least one winding of the length of thread on the second side of the rigid ring around the meat and cooling the rigid ring, the length of thread and the meat from the first temperature to a second, lower temperature, causing thermal contraction of the meat, the rigid ring and the length of thread, a thermal contraction of the length of thread along the rigid ring translating to a compressive force on the at least one winding around the meat to place a constriction on the meat, the cooling thus compressing the meat radially and lengthening the meat longitudinally.

The method described above may also include providing a plurality of rigid rings, each rigid ring of the plurality of rigid rings comprising a length of thread wound around the rigid ring, a first end of the length of thread secured fixedly to a first side of the ring and a second end of the length of thread secured movably to the length of thread such as to allow the length of thread on the second side of the rigid ring to form at least one winding around the meat. Other steps of the method may include placing each of the plurality of rigid rings with the length of thread winding around the meat along a length of the meat at a first temperature, placing the length of thread on the second side of each of the plurality of rigid rings, for forming at least one winding around the meat, around the meat to form the at least one winding around the meat and cooling the meat, the plurality of rigid rings and the length of thread on each of the plurality of rigid rings from the first temperature to a second, lower temperature, causing thermal contraction of the meat, the plurality of rigid rings and the length of thread on each of the plurality of rigid rings, wherein a thermal contraction of the length of thread along each of the plurality of the rigid rings translating to a compressive force on the at least one winding around the meat of each of the plurality of rigid rings to place a constriction on the meat, the cooling thus compressing the meat and lengthening the meat.

The above methods may also include a step of heating the rigid ring to a temperature greater than a temperature of the meat before the step of placing. In these embodiments, the rigid ring may be heated to a temperature between 50° C. and 60° C. before the step of placing. The second temperature mentioned above may be between 3° C. and 10° C. In embodiments, the first end of the length of thread is welded to the first side of the ring and the second end of the length of thread is secured to the length of thread with a slip knot. In embodiments, a cross section of the thread is selected from the group consisting of circular and elliptical. The thread may actually resemble a strap more than thread. The thread may have a coefficient of thermal expansion and contraction greater than 200 micrometers per meter-K. The method described above may also include a step of heating the rigid ring to a temperature greater than 40° C. before the step of placing. In embodiments, the thermal contraction of the winding of the thread in the second end about the meat is disproportionately greater than the contraction of the winding of the thread around the rigid ring. This causes compression of the meat in a radial direction and causes lengthening of the meat along its transverse, longitudinal axis.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g.,"a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g.,"a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. Apparatus for stretching fibers of meat upon cooling to prevent toughening of the meat comprising:
   a rigid ring for placing around the meat; and
   a length of thread for winding around the rigid ring, a first end of the length of thread secured fixedly on a first side of the rigid ring and a second end of the length of thread secured movably on a second side of the ring such as to allow the length of thread on the second side of the rigid ring to form at least one winding around the meat,
   wherein the rigid ring and the thread are adapted for placement around the meat when the meat is at a first temperature, and as the meat cools to a second, lower temperature, the thread contracts in length according to a coefficient of thermal expansion of the thread, a linear contraction along the length of thread along the rigid ring translating to a constriction of the at least one winding around the meat to place a compressive force on the meat, thus minimizing longitudinal contraction of the meat by forcing longitudinal elongation.

2. A plurality of apparatuses according to claim 1, each rigid ring of a plurality of rigid rings spaced apart from other rigid rings of the plurality of rings.

3. The apparatus of claim 1, wherein the rigid ring comprises PVC.

4. The apparatus of claim 1, wherein the thread comprises linear low density polyethylene (LLDPE).

5. The apparatus of claim 1, wherein the thread comprises a thermoplastic material having a thermal expansion/contraction of at least 200 micrometers/meter-K.

6. The apparatus of claim 1, wherein the thread has a coefficient of thermal expansion and contraction greater than a coefficient of thermal expansion and contraction of plastic used for the plurality of plastic rings.

7. The apparatus of claim 2, wherein each of the lengths of thread is sufficiently long for a plurality windings of the thread around one of the plurality of plastic rings and one winding of the thread around the meat.

8. The apparatus of claim 1, wherein the second end of thread, wound around the meat, is from 5% to 10% of the length of the thread.

9. The apparatus of claim 1, wherein as the meat cools to a lower temperature, the rigid ring restricts contraction of the winding of the thread about the rigid ring so that a contraction of the winding of the thread in the second end about the meat is disproportionately greater than the contraction of the winding of the thread around the rigid ring.

10. The apparatus of claim 1, wherein the thread has an elliptical cross section with an average of 5 mm of a major diameter and a minor diameter of the thread.

11. The apparatus of claim 1, wherein the rigid ring is from about 3 cm to 8 cm wide with about 2 mm to 8 mm wall thickness.

12. A method for stretching meat fibers upon cooling to prevent toughening of meat, the method comprising:
    providing a rigid ring, the rigid ring comprising a length of thread wound around the rigid ring, a first end of the length of thread secured fixedly to a first side of the ring and a second end of the length of thread secured movably to the length of thread such as to allow the length of thread on the second side of the rigid ring to form at least one winding around the meat;
    placing the rigid ring with the length of thread winding around the meat along a length of the meat at a first temperature;
    placing the length of thread on the second side of the rigid ring, for forming at least one winding, around the meat; and
    cooling the meat, the rigid ring and the length of thread from the first temperature to a second, lower temperature, causing thermal contraction of the meat, the rigid ring and the length of thread, wherein a thermal contraction of the length of thread along the rigid ring translating to a compressive force on the at least one winding around the meat to place a compressive force on the meat, the cooling thus minimizing contraction of the meat.

13. The method of claim 12 comprising:
    providing a plurality of rigid rings, each rigid ring of the plurality of rigid rings comprising a length of thread wound around the rigid ring, a first end of the length of thread secured fixedly to a first side of the ring and a second end of the length of thread secured movably to the length of thread such as to allow the length of thread on the second side of the rigid ring to form at least one winding around the meat;

placing each of the plurality of rigid rings with the length of thread winding around the meat along a length of the meat at a first temperature;

placing the length of thread on the second side of each of the plurality of rigid rings, for forming at least one winding around the meat, around the meat to form the at least one winding around the meat; and cooling the meat, the plurality of rigid rings and the length of thread on each of the plurality of rigid rings from the first temperature to a second, lower temperature, causing thermal contraction of the meat, the plurality of rigid rings and the length of thread on each of the plurality of rigid rings, wherein a thermal contraction of the length of thread along each of the plurality of the rigid rings translating to a compressive force on the at least one winding around the meat of each of the plurality of rigid rings to place a compressive force on the meat, the cooling thus compressing the meat and lengthening the meat.

14. The method of claim 12, further comprising heating the rigid ring to a temperature greater than a temperature of the meat before the step of placing.

15. The method of claim 12, further comprising heating the rigid ring to a temperature between 50° C. and 60° C. before the step of placing.

16. The method of claim 12, wherein the second temperature is between 3° C. and 10° C.

17. The method of claim 12, wherein the first end of the length of thread is welded to the first side of the ring and the second end of the length of thread is secured to the length of thread with a slip knot.

18. The method of claim 12, wherein a cross section of the thread is selected from the group consisting of circular and elliptical.

19. The method of claim 12, wherein the thread has a coefficient of thermal expansion and contraction greater than 200 micrometers per meter-K.

20. The method of claim 12, further comprising heating the rigid ring to a temperature greater than 40° C. before the step of placing.

21. The method of claim 12, wherein the thermal contraction of the winding of the thread in the second end about the meat is disproportionately greater than the contraction of the winding of the thread around the rigid ring.

22. The method of claim 12, wherein the meat is selected from the group consisting of an animal carcass and a side of the animal carcass.

* * * * *

UNITED STATES PATENT AND TRADEMARK OFFICE
CERTIFICATE OF CORRECTION

| | | |
|---|---|---|
| PATENT NO. | : 9,888,694 B2 | Page 1 of 1 |
| APPLICATION NO. | : 15/064361 | |
| DATED | : February 13, 2018 | |
| INVENTOR(S) | : Millar | |

It is certified that error appears in the above-identified patent and that said Letters Patent is hereby corrected as shown below:

In the Specification

In Column 2, Line 46, delete "it cools." and insert -- it cools; --, therefor.

In Column 2, Line 64, delete "FIG. 8 is flow" and insert -- FIG. 8 is a flow --, therefor.

In Column 8, Line 19, delete "3 mm The" and insert -- 3 mm. The --, therefor.

In Column 8, Lines 23-24, delete "5 mm The" and insert -- 5 mm. The --, therefor.

In Column 8, Lines 62, delete "3 mm The" and insert -- 3 mm. The --, therefor.

In Column 8, Line 66, delete "mm The" and insert -- mm. The --, therefor.

In Column 9, Lines 31-32, delete "8 mm The" and insert -- 8 mm. The --, therefor.

In Column 9, Line 36, delete "mm The" and insert -- mm. The --, therefor.

In Column 10, Line 5, delete "is than" and insert -- is then --, therefor.

In Column 10, Line 51, delete "form" and insert -- from --, therefor.

Signed and Sealed this
Twenty-eighth Day of August, 2018

Andrei Iancu
*Director of the United States Patent and Trademark Office*